US012424241B2

(12) United States Patent
Yang et al.

(10) Patent No.: US 12,424,241 B2
(45) Date of Patent: Sep. 23, 2025

(54) METHOD FOR SEPARATING TARGET SOUND SOURCE FROM MIXED SOUND SOURCE AND ELECTRONIC DEVICE THEREOF

(71) Applicants: SAMSUNG ELECTRONICS CO., LTD., Suwon-si (KR); INDUSTRY-UNIVERSITY COOPERATION FOUNDATION HANYANG UNIVERSITY, Seoul (KR)

(72) Inventors: Jaemo Yang, Suwon-si (KR); Joonhyuk Chang, Suwon-si (KR); Geeyeun Kim, Suwon-si (KR); Hangil Moon, Suwon-si (KR); Kyoungho Bang, Suwon-si (KR); Dail Kim, Suwon-si (KR); Yungyeo Kim, Suwon-si (KR); Minsang Baek, Suwon-si (KR); Wongook Choi, Suwon-si (KR); Jeonghwan Choi, Suwon-si (KR)

(73) Assignees: SAMSUNG ELECTRONICS CO., LTD., Suwon-si (KR); Industry-University Cooperation Foundation Hanyang University, Seoul (KR)

( * ) Notice: Subject to any disclaimer, the term of this patent is extended or adjusted under 35 U.S.C. 154(b) by 227 days.

(21) Appl. No.: 18/235,664

(22) Filed: Aug. 18, 2023

(65) Prior Publication Data

US 2024/0062773 A1 Feb. 22, 2024

Related U.S. Application Data

(63) Continuation of application No. PCT/KR2023/010971, filed on Jul. 27, 2023.

(30) Foreign Application Priority Data

Aug. 18, 2022 (KR) .................. 10-2022-0103538
Sep. 30, 2022 (KR) .................. 10-2022-0125096

(51) Int. Cl.
*G10L 25/81* (2013.01)
*G10L 25/30* (2013.01)

(52) U.S. Cl.
CPC .............. *G10L 25/81* (2013.01); *G10L 25/30* (2013.01)

(58) Field of Classification Search
CPC .......... G10L 25/81; G10L 25/30; G06F 3/165
See application file for complete search history.

(56) References Cited

U.S. PATENT DOCUMENTS 11,114,108 B1 9/2021 Maalouli et al.
11,257,503 B1 2/2022 Lakkavalli et al.
(Continued)

FOREIGN PATENT DOCUMENTS

JP 6-67691 A 3/1994
JP 2000-330587 A 11/2000
(Continued)

OTHER PUBLICATIONS

International Search Report dated Oct. 23, 2023, issued by the International Searching Authority in International Application No. PCT/KR2023/010971 (PCT/ISA/210).
(Continued)

*Primary Examiner* — Vivian C Chin
(74) *Attorney, Agent, or Firm* — Sughrue Mion, PLLC

(57) ABSTRACT

A method for separating a target sound source, includes: obtaining a mixed sound source including at least one sound source; obtaining, based on the mixed sound source, scene information related to the mixed sound source; converting, based on the scene information, a first embedding vector
(Continued)

corresponding to a designated sound source group into a second embedding vector; and separating, based on the mixed sound source and the second embedding vector, the target sound source from the mixed sound source.

20 Claims, 13 Drawing Sheets

(56) References Cited

U.S. PATENT DOCUMENTS

| | | |
|---|---|---|
| 12,051,437 B2 | 7/2024 | Hwang et al. |
| 2009/0097670 A1 | 4/2009 | Jeong et al. |
| 2020/0035256 A1 | 1/2020 | Choi |
| 2020/0160878 A1 | 5/2020 | Heo et al. |
| 2021/0020018 A1 | 1/2021 | Kim et al. |
| 2021/0065735 A1 | 3/2021 | Lumezanu et al. |
| 2022/0165288 A1 | 5/2022 | Wang et al. |
| 2022/0172708 A1 | 6/2022 | Wang et al. |

FOREIGN PATENT DOCUMENTS

| | | |
|---|---|---|
| KR | 10-2003-0016925 A | 3/2003 |
| KR | 10-1456866 B1 | 11/2014 |
| KR | 10-1620866 B1 | 5/2016 |
| KR | 10-2019-0106922 A | 9/2019 |
| KR | 10-2021-0072384 A | 6/2021 |
| KR | 10-2410850 B1 | 6/2022 |

OTHER PUBLICATIONS

Written Opinion dated Oct. 23, 2023, issued by the International Searching Authority in International Application No. PCT/KR2023/010971 (PCT/ISA/237).

Communication issued Jun. 30, 2025 by the European Patent Office in European Patent Application No. 23855072.7.

Tzinis, Efthymios et al., "Improving Universal Sound Separation Using Sound Classification", ICASSP 2020, IEEE, May 4, 2020, pp. 96-100, XP033793569. (5 pages total).

Lee, Joo-Hyun et al., "NAS-TasNet: Neural Architecture Search for Time-Domain Speech Separation", IEEE Access, May 18, 2022, vol. 10, pp. 56031-56043, XP093287735. (13 pages total).

| | Bus | Metro | Metro station | Park | Street traffic |
|---|---|---|---|---|---|
| Walk, footstep | 1 | 1 | 1 | 0 | 0 |
| Wind | 0 | 0 | 0 | 1 | 1 |
| Subway and metro and underground | 0 | 1 | 1 | 0 | 0 |
| Motorcycle | 1 | 0 | 0 | 0 | 1 |
| Machine gun | 1 | 1 | 1 | 1 | 1 |
| Car passing by | 1 | 0 | 0 | 0 | 1 |
| Bus | 1 | 0 | 0 | 0 | 1 |
| Bicycle bell | 0 | 0 | 0 | 1 | 1 |
| Bark | 0 | 0 | 0 | 1 | 1 |
| Speech - child, female, male | 1 | 1 | 1 | 1 | 0 |
| Police car | 1 | 0 | 0 | 0 | 1 |
| Fire alarm | 0 | 1 | 1 | 0 | 0 |
| Vehicle horn and car horn and honking | 1 | 0 | 0 | 0 | 1 |

FIG. 10

METHOD FOR SEPARATING TARGET SOUND SOURCE FROM MIXED SOUND SOURCE AND ELECTRONIC DEVICE THEREOF

CROSS-REFERENCE TO RELATED APPLICATIONS

This application is a continuation of International Application No. PCT/KR2023/010971 filed on Jul. 27, 2023, designating the United States, in the Korean Intellectual Property Receiving Office, and claiming priority to Korean Patent Application No. 10-2022-0103538 filed on Aug. 18, 2022, and Korean Patent Application No. 10-2022-0125096 filed on Sep. 30, 2022, the disclosures of which are all hereby incorporated by reference herein in their entireties.

BACKGROUND

1. Technical Field

The disclosure relates to a method for separating a target sound source from a mixed sound source using scene information about a mixed sound source and an electronic device thereof.

2. Description of Related Art

As phone calling, recording of external voice, or capturing video using a portable digital device is commonplace, a microphone may be used to obtain sound in various digital devices, such as consumer electronics (CE) devices and mobile phones. However, the sound obtained by the microphone may include a plurality of sound sources that include background noise or other sounds not pertinent to a phone or video call.

Sound source separation technology may be used to separate two or more sounds for each sound source. For example, sound source separation technology may be used to extract only the singer's voice from stereo music or separate two or more audio signals recorded with one microphone. Sound source separation technology may also be used for noise canceling in vehicles or mobile phones.

Sound source separation technology may perform recording using several microphones, and then separate sound sources using the correlation between the signals obtained by the microphones. Meanwhile, methods for adopting artificial intelligence in sound source separation technology are being introduced. Some of these methods perform voice separation using pre-trained voices or noise patterns, or statistical data information.

SUMMARY

According to an aspect of the disclosure, a method for separating a target sound source, includes: obtaining a mixed sound source including at least one sound source; obtaining, based on the mixed sound source, scene information related to the mixed sound source; converting, based on the scene information, a first embedding vector corresponding to a designated sound source group into a second embedding vector; and separating, based on the mixed sound source and the second embedding vector, the target sound source from the mixed sound source.

The method may further include: performing a first pre-training process to learn a scene information vector based on obtaining an input sound source, and the obtaining the scene information may include outputting the scene information vector based on the mixed sound source.

The performing the first pre-training process may include outputting the scene information vector based on the obtaining of the input sound source and learning to classify a designated scene based on the output scene information vector.

The obtaining the scene information may include generating an instance vector corresponding to the scene information based on the mixed sound source.

The first embedding vector may correspond to an entirety of the designated sound source group, and the converting the first embedding vector into the second embedding vector may comprise convert the first embedding vector into the second embedding vector corresponding to at least a portion of the designated sound source group based on the scene information.

The method may further include: performing a second pre-training process to learn partial embedding vectors, each of the partial embedding vectors corresponding to a respective sound source included in the designated sound source group, and the first embedding vector may be a sum vector of the partial embedding vectors.

The converting the first embedding vector into the second embedding vector may include: identifying the target sound source included in the designated sound source group corresponding to the scene information; and converting the first embedding vector into the second embedding vector to correspond to the target sound source.

The designated sound source group may include at least one target sound source designated to correspond to the scene information.

The method may further include performing a third pre-training process, based on an embedding vector between specific scene information and a specific target sound source corresponding to the specific scene information, to learn the conversion from the first embedding vector into the second embedding vector.

The separating the target sound source may include generating the target sound source having a vector form with the same size as the mixed sound source by applying the second embedding vector to the mixed sound source.

According to an aspect of the disclosure, an electronic device including: an input interface; a memory storing at least one instruction; and at least one processor operatively connected with the input interface and the memory, wherein the at least one processor is configured to execute the at least one instruction to: obtain, from the input interface, a mixed sound source including at least one sound source, obtain, based on the mixed sound source, scene information related to the mixed sound source, convert, based on the scene information, a first embedding vector corresponding to a designated sound source group into a second embedding vector, and separate, based on the mixed sound source and the second embedding vector, the target sound source from the mixed sound source.

The at least one processor may be further configured to execute the at least one instruction to: perform a first pre-training process to learn a scene information vector based on obtaining an input sound source, and obtain the scene information by outputting the scene information vector based on the mixed sound source.

The at least one processor the first pre-training process may include outputting the scene information vector based on the obtaining of the input sound source and learing to classify a designated scene based on the output scene information vector.

The at least one processor may be further configured to execute the at least one instruction to obtain the scene information by generating an instance vector corresponding to the scene information based on the mixed sound source.

The first embedding vector corresponds to an entirety of the designated sound source group, and the at least one processor is further configured to execute the at least one instruction as at least part of the converting the first embedding vector into the second embedding vector, convert the first embedding vector into the second embedding vector corresponding to at least a portion of the designated sound source group based on the scene information.

The at least one processor may be further configured to execute the at least one instruction to perform a second pre-training process to learn partial embedding vectors, each of the partial embedding vectors corresponding to a respective sound source included in the designated sound source group, and the first embedding vector may be a sum vector of the partial embedding vectors.

The at least one processor may be further configured to execute the at least one instruction to convert the first embedding vector into the second embedding vector by identifying the target sound source included in the designated sound source group corresponding to the scene information and converting the first embedding vector into the second embedding vector to correspond to the target sound source.

The designated sound source group may include at least one target sound source designated to correspond to the scene information.

The at least one processor may be further configured to execute the at least one instruction to perform a third pre-training process, based on an embedding vector between specific scene information and a specific target sound source corresponding to the specific scene information, to learn the conversion from the first embedding vector into the second embedding vector.

The at least one processor may be further configured to execute the at least one instruction to separate the target sound source by generating the target sound source having a vector form with the same size as the mixed sound source by applying the second embedding vector to the mixed sound source.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a table regarding the correlation between each piece of scene information and each target sound source according to one or more embodiments of the disclosure.

DETAILED DESCRIPTION

Figure 1:
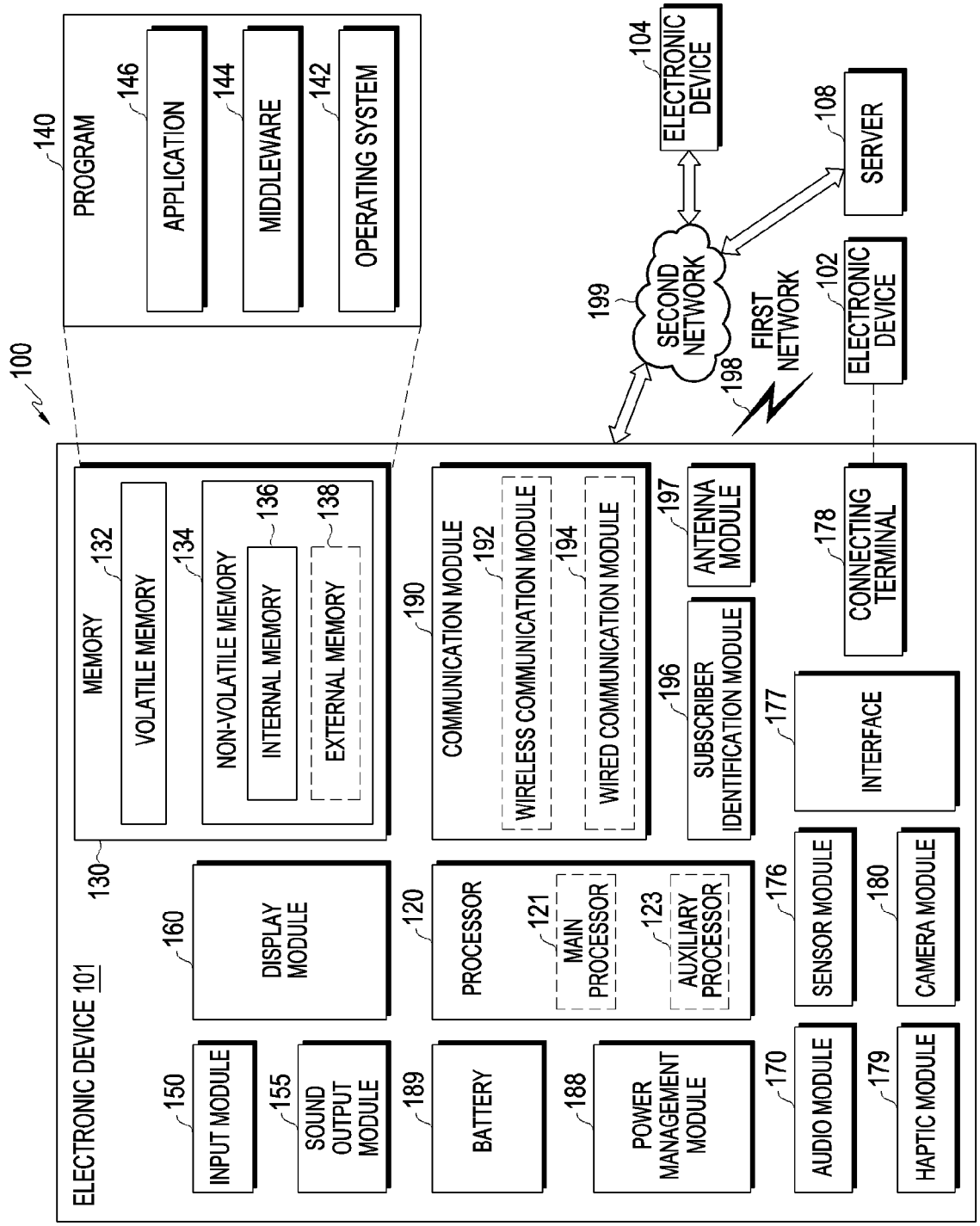
FIG. 1 is a block diagram illustrating an electronic device in a network environment according to one or more embodiments of the disclosure.

FIG. 1 is a block diagram illustrating an electronic device 101 in a network environment 100 according to one or more embodiments of the disclosure.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to one or more embodiments, the electronic device 101 may communicate with the electronic device 104 via the server 108. According to one or more embodiments, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In one or more embodiments, at least one (e.g., the connecting terminal 178) of the components may be omitted from the electronic device 101, or one or more other components may be added in the electronic device 101. According to one or more embodiments, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one or more embodiments, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to one or more embodiments, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to one or more embodiments, the auxiliary processor 123 (e.g., an image signal processor or a communication processor) may be implemented as part of another component (e.g., the camera module 180 or the communication module 190) functionally related to the auxiliary processor 123. According to one or more embodiments, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to one or more embodiments, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to one or more embodiments, the display 160 may include a touch sensor configured to detect a touch, or a pressure sensor configured to measure the intensity of a force generated by the touch.

The audio module 170 may convert a sound into an electrical signal and vice versa. According to one or more embodiments, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to one or more embodiments, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to one or more embodiments, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to one or more embodiments, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to one or more embodiments, the haptic module 179 may include, for example, a motor, a piezoelectric element, or an electric stimulator.

The camera module 180 may capture a still image or moving images. According to one or more embodiments, the camera module 180 may include one or more lenses, image sensors, image signal processors, or flashes.

The power management module 188 may manage power supplied to the electronic device 101. According to one or more embodiments, the power management module 188 may be implemented as at least part of, for example, a power management integrated circuit (PMIC).

The battery 189 may supply power to at least one component of the electronic device 101. According to one or more embodiments, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to one or more embodiments, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to one or more embodiments, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to one or more embodiments, the antenna module 197 may include one antenna including a radiator formed of a conductive body or conductive pattern formed on a substrate (e.g., a printed circuit board (PCB)). According to one or more embodiments, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to one or more embodiments, other parts (e.g., radio frequency integrated circuit (RFIC)) than the radiator may be further formed as part of the antenna module 197.

According to one or more embodiments, the antenna module 197 may form a mmWave antenna module. According to one or more embodiments, the mmWave antenna module may include a printed circuit board, a RFIC disposed on a first surface (e.g., the bottom surface) of the printed circuit board, or adjacent to the first surface and configured to support a designated high-frequency band (e.g., the mmWave band), and a plurality of antennas (e.g., array antennas) disposed on a second surface (e.g., the top or a side surface) of the printed circuit board, or adjacent to the second surface and configured to transmit or receive signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one or more embodiments, commands or data may be transmitted or received between the electronic device 101 and the external electronic device 104 via the server 108 coupled with the second network 199. The external electronic devices 102 or 104 each may be a device of the same or a different type from the electronic device 101. According to one or more embodiments, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to one or more embodiments, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to one or more embodiments of the disclosure may be one of various types of electronic devices. The electronic devices may include, for example, a portable communication device (e.g., a smart phone), a computer device, a portable multimedia device, a portable medical device, a camera, an electronic device, or a home appliance. According to one or more embodiments of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one or more embodiments, the module may be implemented in a form of an application-specific integrated circuit (ASIC).

One or more embodiments of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one or more embodiments, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
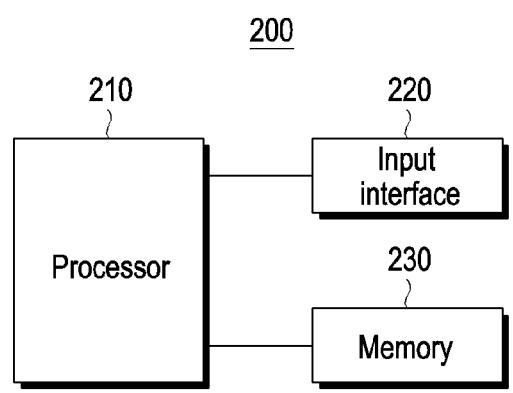
FIG. 2 is a block diagram illustrating an electronic device according to one or more embodiments of the disclosure.

FIG. 2 is a block diagram illustrating an electronic device 200 according to one or more embodiments of the disclosure.

Referring to FIG. 2, according to one or more embodiments, an electronic device 200 (e.g., the electronic device 101 of FIG. 1) may include an input interface 220, a memory 230, and/or a processor 210. In one or more examples, the input interface 220 may be a portion of an input module (e.g., the input module 150 of FIG. 1) that receives sound data from a source external to the electronic device (e.g., the user) and may be, for example, a microphone.

According to one or more embodiments, the memory 230 (e.g., the memory 130 of FIG. 1) may store various commands or data used by at least one component (e.g., the processor 120 or the sensor module 176 of FIG. 1) of the electronic device 200. According to one or more embodiments, the memory 230 may include a non-volatile memory, a volatile memory, a flash memory, a hard disk drive (HDD) or a solid state drive (SDD). The memory 230 may be accessed by the processor 210, and data read/record/modify/delete/update may be carried out by the processor 210.

According to one or more embodiments, the processor 210 (e.g., the processor 120 of FIG. 1) may execute the commands or operations stored in the memory 230. Specific commands or operations of the processor 210 are described below.

According to one or more embodiments, the processor 210 may train a neural network using a program stored in the memory 230. For example, the processor 210 may train the neural network for generating a pre-defined scene information vector based on obtaining an input sound source, generating a partial embedding vector corresponding to each target sound source included in a designated sound source group, or generating an embedding vector based on an embedding vector between specific scene information and a specific target sound source. The neural network may be designed to emulate the high learning capacity of the human brain on the computer and may include a plurality of weighted network nodes, which emulate the neurons of the human neural network. The plurality of network nodes may send and receive data according to their respective connection relationships so as to simulate the synaptic activity of neurons that send and receive signals through synapses. In one or more examples, the neural network may include a deep learning model developed from the neural network model. In a deep learning model, a plurality of network nodes may be located in different layers and exchange data according to a convolutional connection relationship. Examples of neural network models include a deep neural network (DNN), a convolutional neural network (CNN), a recurrent neural network, a restricted Boltzmann machine, a deep belief network, a deep Q-Network, or such various deep learning schemes, and may be applied in fields such as vision recognition, speech recognition, natural language processing, and voice/signal processing.

According to one or more embodiments, the processor 210 may be a general-purpose processor (e.g., CPU), may be an AI-dedicated processor (e.g., GPU) for artificial intelligence learning, or may be any other processor structure known to one of ordinary skill in the art.

According to one or more embodiments, the memory 230 may store the neural network model generated through the learning algorithm for classifying or recognizing data. For example, the memory 230 may store a deep learning model generated as a result of learning performed by the processor 210.

According to one or more embodiments, the processor may include a data learning unit for learning the neural network for data classification or recognition. The data learning unit may learn criteria as to how to classify and recognize data using learning data as well as what learning data to use to determine data classification/recognition. The data learning unit may obtain learning data to be used for training and apply the obtained learning data to the deep learning model to train the deep learning model. The data learning unit may be manufactured in the form of at least one hardware chip (e.g., integrated circuit (IC)) to be equipped as part of the processor 210. In one or more examples, the data learning unit may be implemented as software. When implemented as a software module (or program module including instructions), the software module may be stored in non-transitory computer-readable media. In one or more examples, the at least one software module may be provided by the operating system (OS) or by an application.

According to one or more embodiments, the data learning unit may include a learning data obtaining unit and a model learning unit. The learning data obtaining unit may obtain learning data necessary for the neural network model model for classifying and recognizing data. The model learning unit may train the neural network model to have determination criteria regarding how to classify predetermined data using the obtained learning data. In one or more examples, the model learning unit may train the neural network model via supervised learning which uses at least part of the learning data as a reference for determination. In one or more examples, the model learning unit may train the neural network model through unsupervised learning that discovers determination criteria by being self-trained using learning data without supervision. Furthermore, the model learning unit may train the neural network model through reinforcement learning using feedback about whether the result of determination of context according to learning is correct.

The model learning unit may train the neural network model using learning algorithms including, for example, error back-propagation or gradient descent.

In one or more embodiments, if the neural network model is trained, the model learning unit may store the trained neural network model in the memory 230. In one or more examples, the model learning unit may store the trained neural network model in a memory of a server connected to the electronic device through a wired or wireless network.

In one or more embodiments, the data learning unit may pre-process the obtained data to enhance the analysis result of the recognition model, save resources or time necessary to generate the recognition model, or allow the obtained data to be used for learning for context determination. For example, the data learning unit may process the obtained data into a designated format to allow the model learning unit to use the obtained learning data for learning for image recognition. The data learning unit may select data necessary for learning from among the obtained learning data or the pre-processed learning data. The selected learning data may be provided to the model learning unit.

In one or more embodiments, the data learning unit may further include a model evaluating unit to enhance the analysis result of the neural network model. The model evaluating unit may enter evaluation data to the neural network model and, when the analysis result output from the evaluation data fails to meet a predetermined reference, allow the model learning unit to re-learn. In one or more examples, the evaluation data may be data defined to evaluate the recognition model. In one or more examples, when the number or ratio of incorrect analysis results among the analysis results of the recognition model trained for the evaluation data exceeds a designated threshold, the model evaluating unit may evaluate that the recognition model fails to meet a predetermined reference.

Although the processor 210 and the memory 230 are described as functionally divided from each other, the above-described components may be integrated into a single module, which may be referred to as an AI module.

The above-described artificial intelligence technology may be used in voice processing fields, such as sound source separation, voice extraction, or noise cancellation. For example, as one AI-based sound source separation technology, audio signal analysis technology and deep learning technology may be combined to separate components for each sound source and use the same to extract only a desired target sound source from a plurality of sound sources or create new content based on the separated sound source.

Figure 3A:
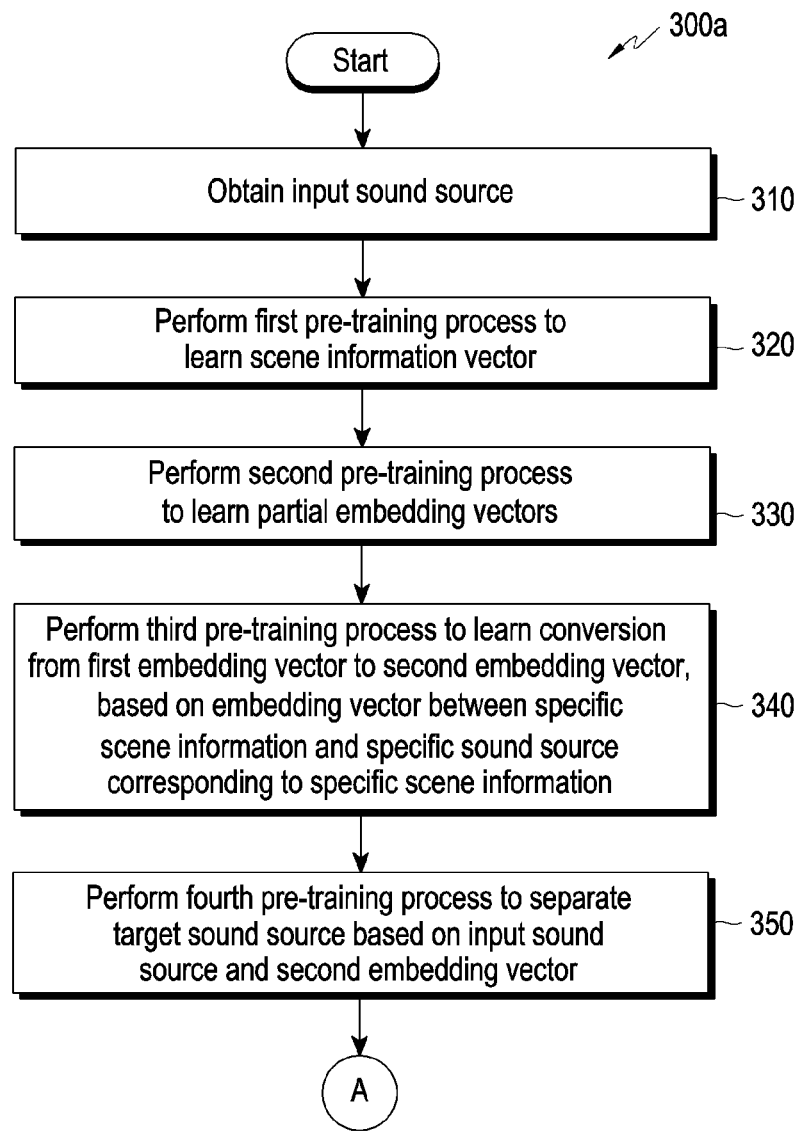
FIGS. 3A and 3B are flowcharts illustrating a method for separating a target sound source according to one or more embodiments of the disclosure.
Figure 3B:
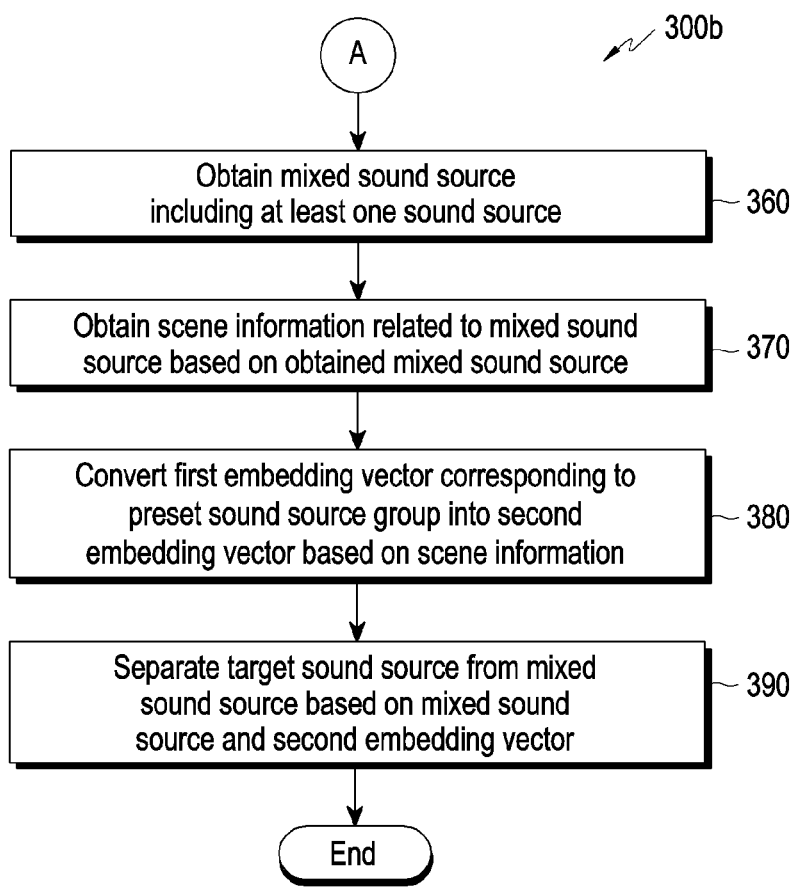
Figure 4:
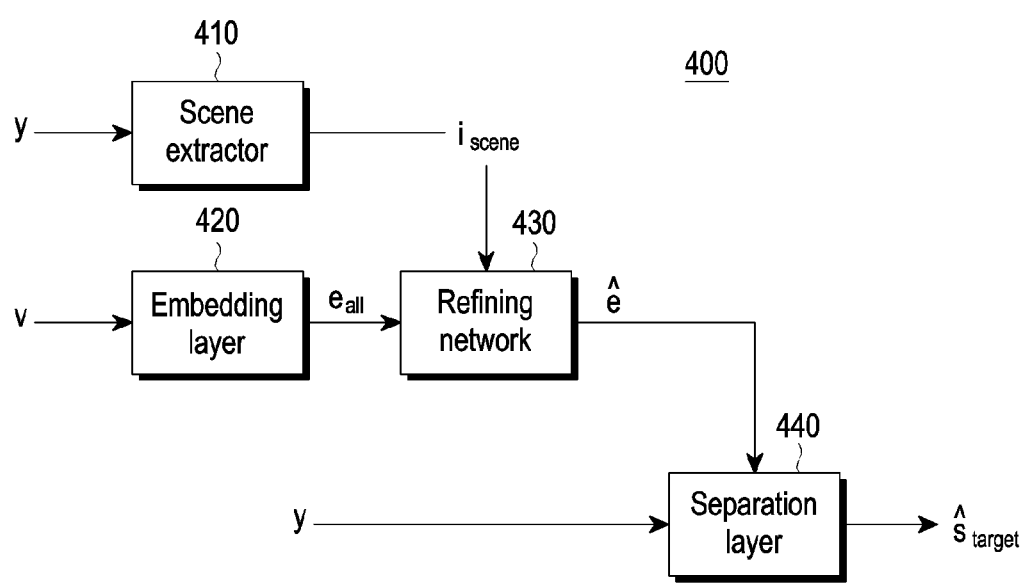
FIG. 4 is a view schematically illustrating a system for separating a target sound source according to one or more embodiments of the disclosure.

FIGS. 3A and 3B are flowcharts illustrating methods 300a and 300b for separating a target sound source according to one or more embodiments of the disclosure. FIG. 4 is a view schematically illustrating a system 400 for separating a target sound source according to one or more embodiments of the disclosure.

Referring to FIGS. 3A, 3B, and 4, according to one or more embodiments, a system 400 for separating a target sound source from a plurality of sound sources may include a scene extractor 410 receiving a mixed sound source and outputting scene information, an embedding layer 420 learning an embedding vector corresponding to at least one target sound source included in a designated sound source group, a refining network 430 refining the learned embedding vector of the embedding layer 420 based on the scene information, and a separation layer 440 separating the mixed sound source based on the refined embedding vector.

In one or more embodiments, in the system 400 for separating the target sound source, a sound source signal y, which may be a T-long time-domain waveform, and a touchscreen vector $O=[o_1, \ldots, o_N]^T$, may be provided as inputs. In one or more examples, N may be the number of sounds (e.g., acoustic events) included in the designated sound group. For example, to extract the nth sound, the target sound vector o may be a one-hot vector, where the element (o_n) corresponding to the target sound may be set to 1, and another element (o_j) (where j is not n) may be set to 0. When the sound source signal y and the target sound vector are input, the target sound source may be estimated as $\hat{x}=DNN(y, o)$. In one or more examples, nonlinear transformation of a deep neural network (DNN) may be applied. A Conv-TasNet architecture configured to separate sound sources in the time domain and extract frameworks may be used.

In one or more embodiments, when the sound source signal y is input, the intermediate expression $H=[h_1, \ldots, h_F]$ of the mixture of the system 400 for separating the target sound source may be generated. In one or more examples, h f denotes the feature of the fth frame of the D dimension, which is the dimension of the feature space, and F is the total number of frames.

If the target sound vector $O=[o_1, \ldots, o_N]^T$ is input in a parallel manner, the embedding layer 420 may apply target embedding $c=\Sigma_{n=1}^{N} o_n e_n$ to provide an encoded expression of the target sound source. The intermediate expression H and target embedding c may be combined into an integrated expression $Z=[z_1, \ldots, z_F]$, and the system 400 for separating the target sound source may separate and output only the target sound source.

In one or more embodiments, the system 400 for separating the target sound source may apply the received target sound vector $O=[o_1, \ldots, o_N]^T$ to the designated embedding vector $[e_1, \ldots, e_N]$. In one or more embodiments, the system 400 for separating the target sound source may refine the preset embedding vector $[e_1, \ldots, e_N]$ through the scene information about the input mixed sound source.

In one or more embodiments, the methods 300a and 300b for separating the target sound source may include one or more operations of method 300a for pre-training the system 400 for separating the target sound source and one or more operations 300b for separating the target sound source using the trained system.

In one or more embodiments, the sound source obtained in operation 310 may be a sound source for pre-training and may be the same or different from the mixed sound source described below, and may include at least one sound source.

In one or more embodiments, in operations 320, 330, 340, and 350, the electronic device (e.g., the electronic device 101 of FIG. 1 or the electronic device 200 of FIG. 2) may perform each of a first pre-training process, a second pre-training process, a third pre-training process, and a fourth pre-training. Specific pre-training by the electronic device is described below. The electronic device may separate the target sound source from the mixed sound source after training is complete by the pre-training.

In operation 320, a first pre-training process may be performed to learn a scene information vector.

In operation 330, a second pre-training process may be performed to learn partial embedding vectors each corresponding to a respective sound included in a preset sound group. For example, if the preset sound group includes 3 preset sounds, 3 partial embedding vectors are learned.

In operation 340, a third pre-training process may be performed to learn, based on an embedding vector between specific scene information and a specific sound source corresponding to specific scene information, a conversion from a first embedding vector to a second embedding vector.

In operation 350, a fourth pre-training process may be performed to learn to separate a target sound source from a plurality of sounds based on the input sound source and a second embedding vector.

In one or more embodiments, in operation 360, the electronic device may obtain a mixed sound source including at least one sound source. For example, the mixed sound source may be generated by being received from an external environment through an input interface (e.g., the communication module 190 of FIG. 1) and be generated through the microphone (e.g., the input interface 220 of FIG. 2) included in the electronic device. In one or more embodiments, the electronic device may receive the mixed sound source, generated through a microphone of an external device, through the input interface. The mixed sound source may be artificially generated, or after generated, filtered or processed.

In one or more embodiments, the mixed sound source may include the target sound source to be separated or may include other sound sources. In one or more examples, y is the input signal corresponding to the mixed sound source, $s_{target,n}$ is the signal corresponding to the nth target sound source to be separated, and $s_{other}$ is the signal corresponding to a sound source other than the target sound source to be separated. Although the number of target sound sources is limited to two, in one or more examples, more target sound sources or other types of target sound sources may be present.

$$y = \sum_{n=1}^{2} s_{target,n} + s_{other} \quad \text{[Equation 1]}$$

In one or more embodiments, the target sound source may include at least one sound source and be represented as the following equation.

$$s_{target} = \sum_{n=1}^{2} s_{target,n} \quad \text{[Equation 2]}$$

In one or more embodiments, in operation 370, the electronic device may obtain scene information related to the mixed sound source based on the obtained mixed sound source. For example, the scene extractor 410 of FIG. 4 may receive the mixed sound source, select appropriate scene information from a designated scene information group, and output the selected scene information. The scene extractor 410 may extract scene information corresponding to the mixed sound source from the received mixed sound source including at least one input sound source through an artificial neural network trained through the first pre-training. In the scene information included in the designated scene information group, at least one respective corresponding sound source may be preset.

In one or more embodiments, in operation 380, the electronic device may convert a first embedding vector corresponding to the designated sound source group into a second embedding vector based on the obtained scene information. For example, the embedding layer 420 of FIG. 4 may learn the first embedding vector corresponding to an entirety of the designated sound source group in the artificial neural network trained through the second pre-training. The refining network 430 of FIG. 4 may convert, through the artificial neural network trained through the third pre-training, the first embedding vector into the second embedding vector based on the obtained scene information.

In one or more embodiments, the embedding layer 420 of FIG. 4 may learn and store the first embedding vector, which is an embedding vector corresponding to the entirety of the designated sound source group. The designated sound source group may include at least one target sound source. The first embedding vector may be a sum vector of partial embedding vectors each corresponding to a respective target sound source. In the designated sound source group, at least one target sound source that may be generated in each piece of scene information included in the scene information group may be preconfigured to correspond to a respective piece of scene information.

In one or more embodiments, the refining network 430 of FIG. 4 may convert the first embedding vector into a second embedding vector corresponding to scene information using a pre-trained neural network. The second embedding vector may be an embedding vector converted into from the first embedding vector stored or pre-trained to separate the target sound source corresponding to each piece of scene information.

In one or more embodiments, in operation 390, the electronic device may separate the target sound source from the obtained mixed sound source based on the refined second embedding vector. The separation layer 440 of FIG. 4 may receive the mixed sound source and the second embedding vector and separate the target sound source using the pre-trained neural network. In one or more examples, the separation layer 440 may be represented as $\hat{s}_{target}$=m·y by estimating the mask m for the mixed sound source and multiplying. In one or more examples, the mask m for the mixed sound source may be estimated using the deep neural network.

In one or more embodiments, the separation layer 440 of FIG. 4 may separate the target sound source from the mixed sound source using the second embedding vector through the artificial neural network trained through the fourth pre-training process.

Figure 5:
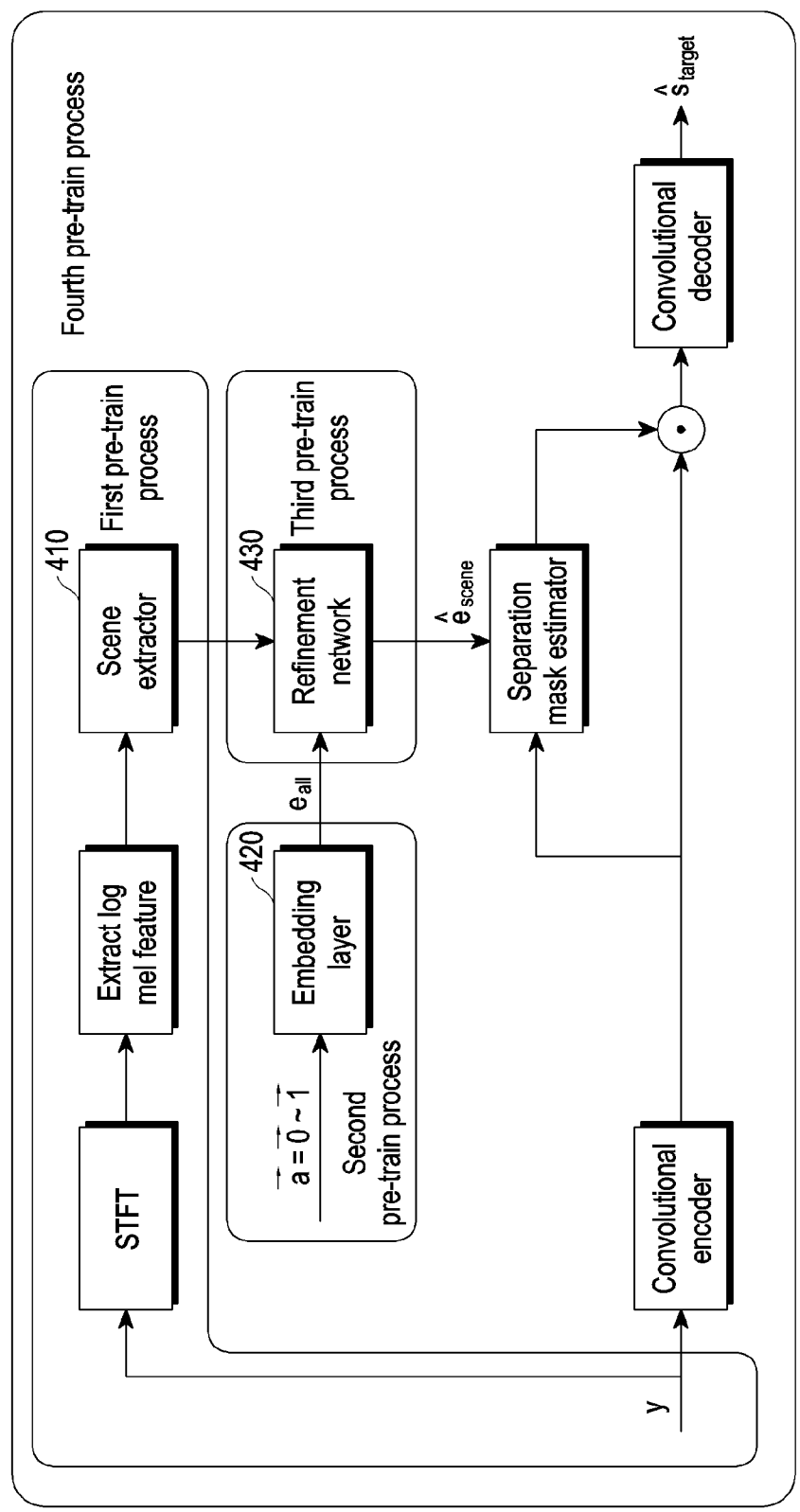
FIG. 5 is a block diagram illustrating a pre-training state of a system for separating a target sound source according to one or more embodiments of the disclosure.
Figure 6:
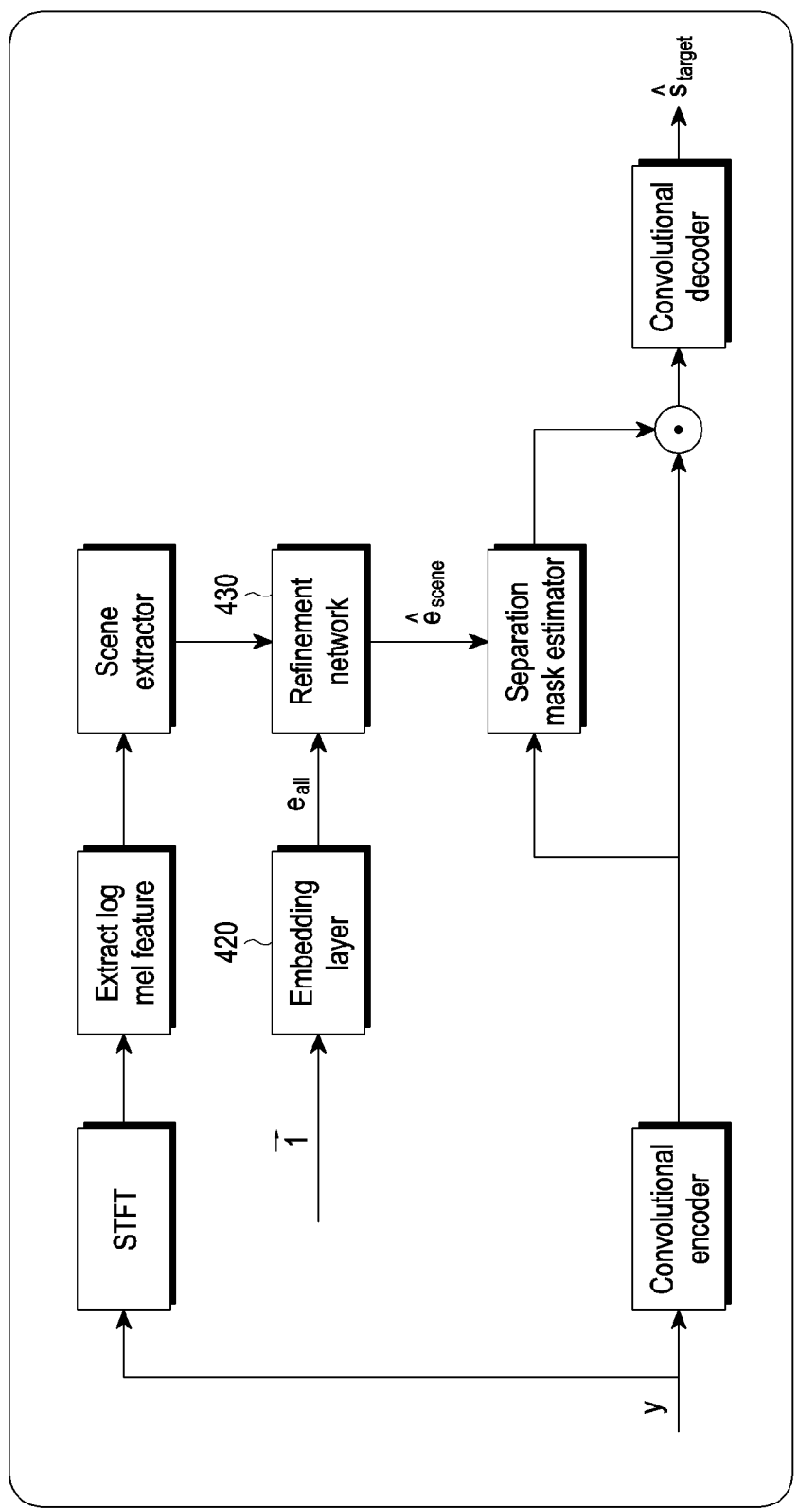
FIG. 6 is a block diagram illustrating a target separating state of a system for separating a target sound source according to one or more embodiments of the disclosure.

FIG. 5 is a block diagram illustrating a pre-training state of a system for separating a target sound source according to one or more embodiments of the disclosure. FIG. 6 is a block diagram illustrating a target sound separating state of a system for separating a target sound source according to one or more embodiments of the disclosure.

Referring further to FIGS. 5 and 6, according to one or more embodiments, the system 400 for separating the target sound source may be pre-trained to receive sound sources and output target sound sources and may then receive a mixed sound source of one or more sound sources and separate target sound sources.

For example, the number N of filters of the encoder may be set to 512, the kernel size L of the filter to 32, the number B of filters of the residual path and bottleneck layer to 128, the number H of filters in depthwise convolution to 256, the kernel size P of the convolutional block to 3, the number X of dilated convolution blocks per repeat to 6, and the number R of repeats to 2.

In one or more embodiments, for the embedding layer 420, a 4×128 matrix, which uses a m-size multi-hot vector as the input and a 128-size vector as the output under the assumption that four target sound sources may be generatable, may be used.

In one or more embodiments, in the pre-training process of the system 400 for separating the target sound source, vectors corresponding to generatable target sound sources corresponding to a number of all cases may be input to the embedding layer 420. In contrast, in a state in which the system 400 for separating the target sound source separates the target sound source, vectors corresponding to all target sound sources included in the designated sound source group may be input to the embedding layer 420.

In one or more embodiments, the scene extractor 410 may be configured to define a fully-separated convolutional module (FUSE-ConvMod) composed of a combination of pointwise, frequency-side depthwise, and temporal-side depthwise convolution and allow the final output to 128 dimensions.

In one or more embodiments, the refining network 430 may increase 128 dimensions to 256 dimensions using the convolution to change only the number of channels, modify the representation using the bias and weight generated from scene information through a conditioning scheme, and then change it back to have an output of 128 dimensions.

Further, in one or more examples, training may be performed with the initial learning rate value of $10^{-4}$ by setting the batchsize to 16 upon training and making the learning rate gradually reduce using the scheduler that exponentially decreases the size to half after 2,000,000 epochs.

Figure 7A:
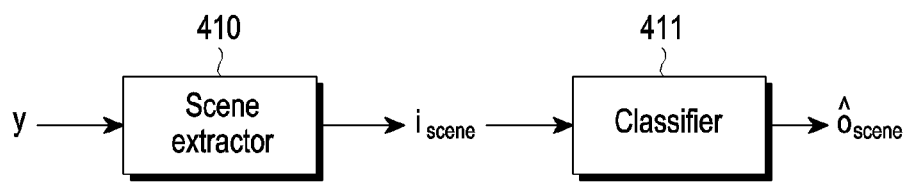
FIG. 7A is a view schematically illustrating a scene extractor for first pre-training according to one or more embodiments of the disclosure.
Figure 7B:
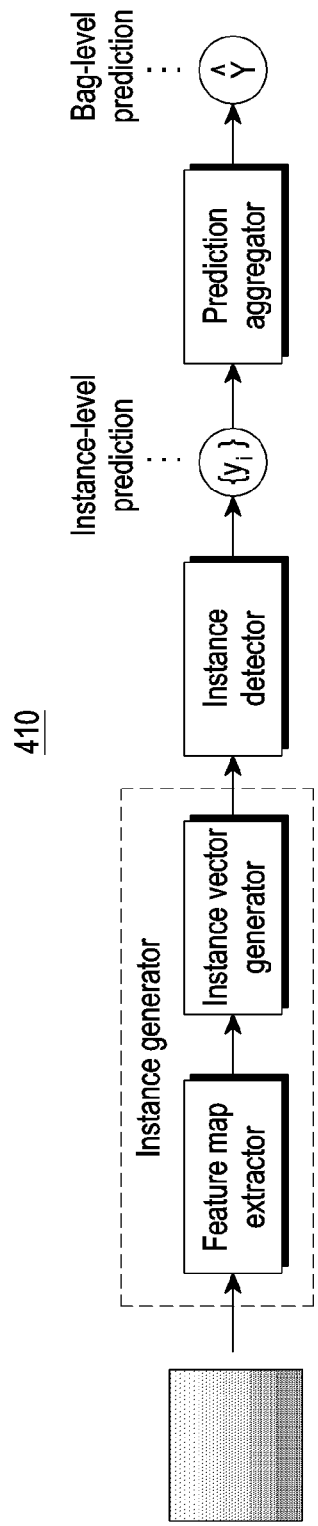
FIG. 7B is a view schematically illustrating an acoustic scene classification (ASC) system using an instance generator according to one or more embodiments of the disclosure.
Figure 7C:
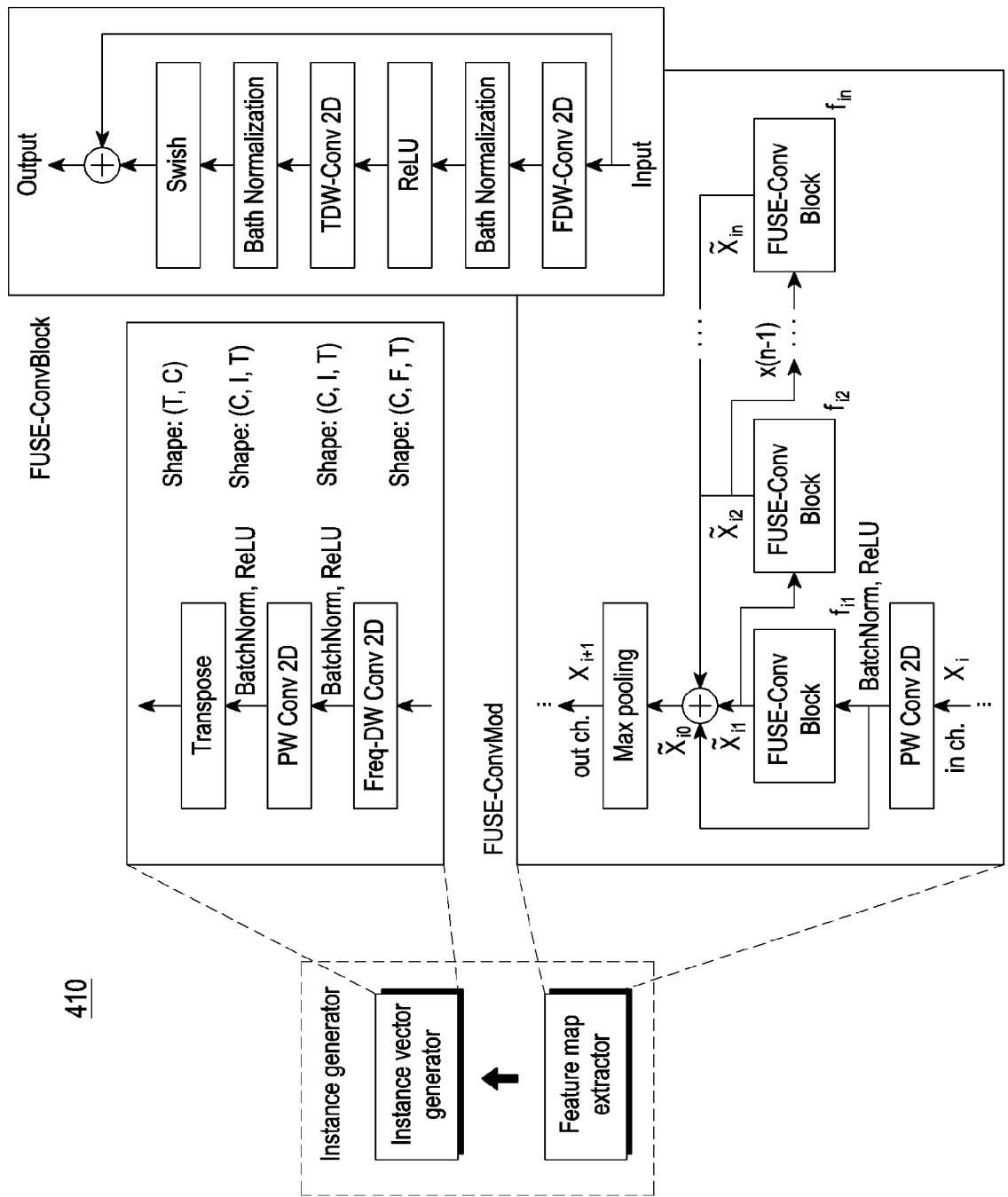
FIG. 7C is a detailed view of an instance generator according to one or more embodiments of the disclosure.

FIG. 7A is a view schematically illustrating a scene extractor 410 for first pre-training according to one or more embodiments of the disclosure. FIG. 7B is a view schematically illustrating an acoustic scene classification (ASC) using an instance generator applied to the scene extractor 410 according to one or more embodiments of the disclosure. FIG. 7C is a detailed view of an instance generator applied to the scene extractor 410 according to one or more embodiments of the disclosure.

Referring to FIG. 7A, according to one or more embodiments, the scene extractor 410 may receive a sound source and output a scene information vector $i_{scene}$. For example, input y is the input signal to the microphone, and is the vector of 1×T, and $i_{scene}$ is scene information extracted from input y of the microphone and may have a 128-dimension vector form. According to one or more embodiments, the classifier 411 may receive the scene information vector $i_{scene}$ from the scene extractor 410 and classify the target scene, and output the scene determination probability vector $\hat{o}_{scene}$. $\hat{o}_{scene}$ may be an m-dimension one-hot vector representing m target scenes.

According to one or more embodiments, the scene extractor 410 may perform training using the sum of the instance-level BCE loss of the one-hot vector representing the target sound source and the weighted BCE loss of the final estimated one-hot vector. According to one or more embodiments, the weighted BCE may be calculated by the following equation.

$$\mathcal{L}_{wBCE} = -(\alpha \cdot p \cdot \log(\hat{p}) + (1-p) \cdot \log(1-\hat{p})) \quad \text{[Equation 3]}$$

Here, a means the weight, p means, for example, the answer or the label, and $\hat{p}$ means the prediction probability value. Here, the weight may be, e.g., $\alpha=9$.

The weighted binary cross entropy may be a variation of the binary cross entropy (BCE). The BCE may be used as a loss that minimizes the penalty given when the difference between the actual label and the estimated probability is large in the binary classification problem. The weighted BCE may be a loss used given a weight to correct the difference in number between positive class and negative class.

Referring further to FIGS. 7B and 7C, in one or more embodiments, the scene extractor 410 may generate and output the instance vector which is the scene information vector corresponding to the scene information based on the obtained mixed sound source. In one or more examples, the input signal is an input signal to the microphone and is a 1×160000 vector corresponding to a length of 10 seconds. The instance vector may be generated from the 10-second input and the scene may be estimated using the same.

In one or more embodiments, the scene extractor 410 of the system implemented in the electronic device (e.g., the processor) may be a module obtained by enhancing the instance generator which is used in the multi-instance vector-based acoustic scene classification (ASC) system among scene classifies that divide pre-defined environments.

In the acoustic scene classification (ASC) system, the acoustic scene may be implemented with various attributes, and be inferred by identifying a combination of some unique attributes thereof. In one or more embodiments, the ASC system may effectively extract and cluster the attributes using a multi-instance learning (MIL) framework. The MIL known as one of the weakly supervised learning methods is a method that extracts the instance from the input data and infers the scene corresponding to the input data with the instance to which no label is designated. In one or more examples, an MIL framework more appropriate for the ASC system may be developed by adopting the instance level loss and instance level label effective in instance extraction and clustering.

In one or more embodiments, the acoustic scene classification (ASC) may be a convolution module designed to aim to recognize acoustic environment considering large contexts and a combination of acoustic events, atmosphere, room size, or culture and to completely separate a low-complexity neural network including convolution filters per dot, per frequency-side depth and per time-side depth. The acoustic scene classification (ASC) may generally consider a large context between complex acoustic data unlike sound separation and sound event detection processing the target event or source. Achieving effective ASC is known as a major subject of an artificial intelligence detection and classification of events and acoustic scenes (DCASE) community using the deep neural network. In one or more embodiments, a particular sound event may represent an acoustic scene, but is not unique, and may also appear in other scenes. For example, tram sound or noise generally represents a tram scene (e.g., inside a tram). However, tram sound or noise may also appear on pedestrians near tramways. In one or more examples, a combination of acoustic events, acoustic noise, and even echoes may be part of an acoustic scene. There may be no unique events or attributes, such as quiet situations or environments. These types of environments may mean that humans may recognize acoustic scenes in a park by the sound of running water and the chirping of birds. However, if there are no events, it may be impossible to tell if a scene takes place in a park or some other exterior scene.

In one or more embodiments, convolutional neural networks (CNNs) may use log-mel spectrograms, mel-frequency cepstral coefficients (MFCCs), constant-Q transforms (CQTs), gammatone frequency cepstral coefficients (GFCCs), and chromatograms. A common strategy for designing an ASC system is to extract advanced feature maps implemented as activation scores of events from raw audio data, and to classify by global average pooling (GAP) or fully connected layers (FC layers) for each scene via supervised learning methods.

The MIL may have a method for generating an instance vector and a method for inferring a bag-level class using an instance as key points. In one or more examples, the focus may be on how to generate instance vectors to adopt an effective instance generator and instance-lever loss.

The instance generator may be divided into two stages: feature map extractor and instance vector generator. First, the feature map extractor may adopt spatially separable convolutional layers with pointwise (PW) and depthwise (DW) convolutional layers instead of using VGG. From a point of view of complexity, the number of parameters of a standard convolutional layer may be $C_{in} \cdot C_{out} \cdot K_H \cdot K_W$. In one or more examples, the complexity may vary depending on the product of the sizes (CM and Cout) of the input channel and the output channel and the height and width (KH and KW) of the kernel. As understood by one of ordinary skill in the art, depthwise separable convolution is an efficient version of the convolution filter while maintaining the receptive field, and may be implemented with two layers: depthwise convolution and pointwise convolution. The complexity of a depth-separable convolutional layer may be calculated as:

$$\underbrace{C_{in} \cdot C_{out}}_{Pointwise} + \underbrace{C_{out} \cdot K_H \cdot K_W}_{Depthwise} = C_{out}(C_{in} + K_H \cdot K_W) \quad \text{[Equation 4]}$$

Furthermore, there may be fully factored convolution filters in the spatially separated convolutional layer. The 3×3 filter may be replaced with a combination of 3×1 and 1×3 filters. The complexity of a spatially separated convolutional layer is as follows.

$$\underbrace{C_{in} \cdot C_{out}}_{Pointwise} + \underbrace{C_{out} \cdot K_H}_{(K_H \times 1) Depthwise} + \underbrace{C_{out} \cdot K_W}_{(1 \times K_W) Depthwise} = \quad \text{[Equation 5]}$$

$$C_{out}(C_{in} + K_H + K_W)$$

When the size (Cout) of the output channel is equal to the number of filters, the complexity of the spatially separable convolutional layer may be calculated only with the addition operation instead of multiplication. For example, the larger the filter size and the number of channels, the more efficient the complexity may be.

Unlike image data with spatial attributes, spectrograms may show different meanings along the frequency and time axes. Therefore, the kernel of spatially separable convolution may be changed into a frequency-side kernel and a time-side kernel. According to previous studies on spatially separable convolutions in audio fields, keyword spotting and ASC tasks may be beneficial not only for enhancing performance, but also for modeling fewer parameters.

In one or more embodiments, the feature map extractor may include four completely separated convolution modules (FUSE-ConvMods) having a harmony of PW, frequency-side DW (FDW), and time-side DW (TDW) convolution layers. An input function may transfer several FULL Separated convolution blocks (FUSE-ConvBlocks) with the PW convolution layer and may be pooled through a max pooling layer. Mathematically, the output used by the ith FUSE-ConvModule is as follows.

$$\tilde{X}_{i0} = PW - Conv2d(X_i) \quad \text{[Equation 6]}$$

$$\tilde{X}_{ik} = f_{ik}(\tilde{X}_{ik-1})(k = 1, \ldots, n)$$

$$X_{i+1} = MaxPooling\left(\sum_{k=0}^{n} \tilde{X}_{ik}\right)$$

In one or more examples, Xi, N, and fik may denote the input of the ith FUSE-ConvMod, the FUSE-ConvBlock of the ith FUSE-ConvMod, and the number of the kth block, respectively. Exceptionally, the last FUSE-ConvMod may not perform pooling.

The output of the feature map extractor may still be a tensor that creates a shape (channel, frequency, or frame). In one or more embodiments, the instance vector generator uses an FDW convolutional layer with full-sized (e.g., fully connected) kernel to aggregate tensors along the frequency axis and obtain the shape of the output from the feature map extractor. Thus, (32×1) FDW convolutional layers are used, followed by affine transform-preserving channels, which may then be reshaped and transposed.

In one or more examples, instance-level loss and bag-level loss may be considered for clustering positive and negative instances. Consequently, the total loss may be expressed as Ltotal=Lbag+Lins.

In one or more embodiments, in bag-level loss, the primary objective of the MIL method is to determine whether each bag is positive or negative and the loss may be introduced by the average of the weighted binary cross entropy (BCE), which may be used to calculate the mean of BCE for each class considering imbalance between positive and negative classes. Further, a test was performed using cross-entropy (CE) for bag-level loss adopted in most classifications, and the results using the average of wBCE and CE loss were compared. The following equation shows the average of wBCE and CE. Here, wBCEs, C, and a were adopted for the mean of wBCEs, number of classes, and loss function, which is the class imbalance coefficient, respectively, and a was set to C−1. If α is 1, the mean of wBCEs may be equal to the mean of BCEs without considering class imbalance.

$$\overline{wBCEs_{bag}} = -\frac{1}{C}\sum_{l=1}^{c}(\alpha \cdot Y_l \ln \hat{Y}_l + (1-Y_l)\ln(1-\hat{Y}_l)) \quad \text{[Equation 7]}$$

$$CE_{bag} = -\sum_{l=1}^{c} Y_l \ln \hat{Y}_l$$

In one or more embodiments, since instances do not have labels, each instance may be assigned a label using the bag-level ground truth. The following equation shows how to define instance-level labels using instance prediction.

$$L_{ins} = -\frac{1}{NC}\sum_{i=1}^{N}\sum_{l=1}^{C}(\alpha \cdot y'_{il}\ln \hat{y}_{il} + (1-y'_{il})\ln(1-\hat{y}_{il})) \quad \text{[Equation 8]}$$

$$y'_{il} = \begin{cases} 1, & \text{if } \operatorname{argmax}_t \hat{y}_{il} = t \\ 0, & \text{otherwise} \end{cases}$$

If the index of the maximum prediction score among the classes is equal to the correct answer for each instance, a positive label may be assigned, otherwise a negative label may be assigned. If the index of the maximum prediction score among the classes is equal to the correct answer for each instance, a positive label may be assigned, otherwise a negative label may be assigned. The positive label may be defined as a one-hot vector, and the negative label may be defined as a zero vector. The model may cluster individual instances and negative numbers using the mean of the weighted BCEs for the instance-level loss for the same reason as the bag-level loss. The entropy of all classes may be averaged, and bags may be averaged.

In one or more examples, at the start of training, all parameters may be set randomly and instance-level labels may be set to any labels regardless of whether the instance is unique. Since the bag-level loss is computed as the ground truth (e.g., information that is known to be real or true), the bag-level loss may correctly guide the instance-level labels in the right direction as the training step progresses, otherwise the instance-level labels may end up being placed in the wrong label space.

Figure 8:
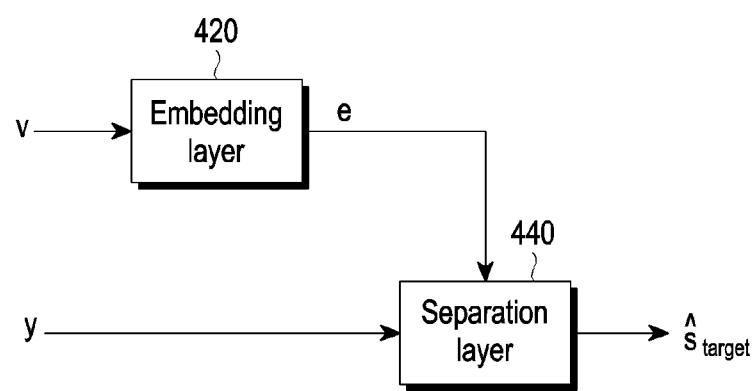
FIG. 8 is a view schematically illustrating an embedding layer for second pre-training according to one or more embodiments of the disclosure.

FIG. 8 is a view schematically illustrating an embedding layer 420 for second pre-training according to one or more embodiments of the disclosure.

Referring further to FIG. 8, according to one or more embodiments, the sound source input y is 1×T vector-shaped input signal vector, and e is the embedding vector for the target sound source, for example one produced by receiving a 4-dimensional input and encoding it in a 128-dimensional vector form. The 4-dimensional input (v) may be a vector in any case between $[0, 0, 0]^T$ and $[1, 1, 1, 1]^T$. The target sound source $\hat{s}_{target}$ is separated from the mixed sound source y and is a 1×T-shaped output.

In one or more embodiments, the 4-dimensional input (v) corresponds to each sound source included in the designated sound source group. The 4-dimensional input may comprise 1's as its components when including the corresponding sound source, and comprise 0's as its components when not including the corresponding sound source.

In one or more embodiments, the embedding layer 420 may learn partial embedding vectors to respectively represent four sound sources included in the designated sound source group in second pre-training. For example, the embedding layer 420 may learn partial embedding vectors corresponding to the inputs $[1, 0, 0, 0]^T$, $[0, 1, 0, 0]^T$, $[0, 0, 1, 0]^T$, and $[0, 0, 0, 1]^T$ corresponding to the respective sound source.

In one or more embodiments, the designated first embedding vector (e_all) output when the 4-dimensional input (v) $[1, 1, 1, 1]^T$ is input to the embedding layer 420 may be a sum vector of partial embedding vectors.

In one or more embodiments, the embedding layer 420 may perform learning on the negative SI-SDR with the output target sound source as loss. The negative SI-SDR may be calculated by the following equation.

$$\mathcal{L}_{SI-SDR} = -10\log_{10}\left(\frac{\left\|\frac{\hat{s}^T s}{\|s\|^2}s\right\|^2}{\left\|\frac{\hat{s}^T s}{\|s\|^2}s - \hat{s}\right\|^2}\right) \quad \text{[Equation 9]}$$

In one or more examples, s may mean the target signal (e.g., correct answer), and may mean the output of the neural network. SI-SDR is a variation of SDR, and SDR is a log-scale expression of the ratio of signal to distortion and the larger the size, the less distortion. However, since it reacts sensitively to changes in signal magnitude, the metric corrected for this is SI-SDR, and the embedding layer 420 may learns to minimize SI-SDR by adding a negative sign to thereby maximize SI-SDR.

Figure 9A:
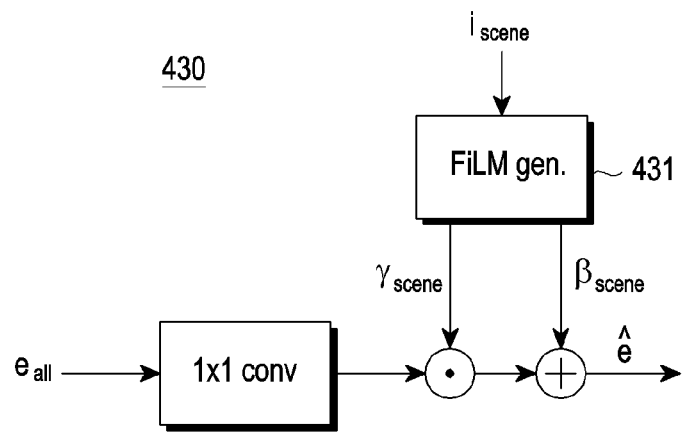
FIG. 9A is a detailed view of a refining network according to one or more embodiments of the disclosure.
Figure 9B:
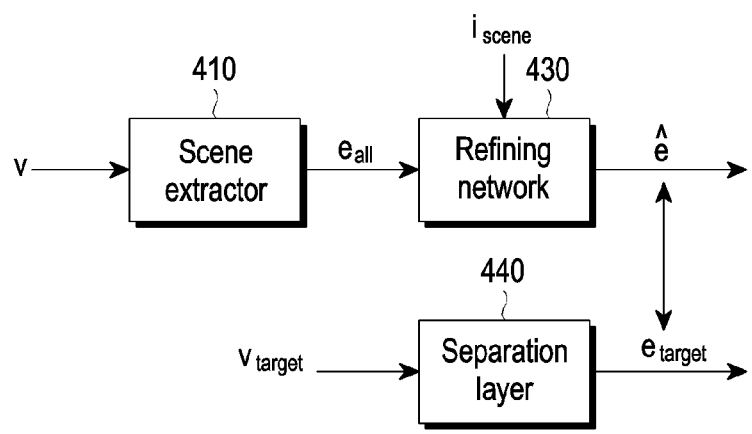
FIG. 9B is a view schematically illustrating a refining network for third pre-training according to one or more embodiments of the disclosure.

FIG. 9A is a detailed view of a refining network 430 according to one or more embodiments of the disclosure. FIG. 9B is a view schematically illustrating a refining network 430 for third pre-training according to one or more embodiments of the disclosure.

Referring to FIG. 9A, according to one or more embodiments, the refining network 430 may refine a first embedding vector representing an entirety of the designated sound source group into a second embedding vector representing a target sound source based on scene information.

In one or more embodiments, the refining network 430 may use feature-wise linear modulation (FiLM) used to combine information about other features containing necessary information when training a deep learning model with the deep learning model. This combination technique is called conditioning and may be used to train a deep learning model in a desired direction. In one or more embodiments, as shown in the following equation, the refining network 430 may refine the embedding vector using the scaling vector $\gamma_{i,c}$ and shift vector $\beta_{i,c}$ output from the FiLM generator 431.

$$\text{FiLM}(F_{i,c}|\gamma_{i,c},\beta_{i,c}) = \gamma_{i,c} F_{i,c} + \beta_{i,c} \quad \text{[Equation 10]}$$

In one or more embodiments, FiLM may pass the features to be conditioned through the respective layers, and then multiply one by the feature of the part to be conditioned as the scaling vector $\gamma_{i,c}$ and add the other as the shift vector $\beta_{i,c}$, thereby setting the direction of training the model. In one or more embodiments, the FiLM generator 431 may be a layer that generates the scaling vector and shift vector for the refining network 430, and may use various layers, such as fully connected layers and convolutional layers.

In one or more embodiments, the refining network 430 may refine the first embedding vector into the second embedding vector by using the scaling vector $\gamma_{scene}$ and shift vector $\beta_{scene}$, respectively, which are output by inputting the scene information to the FiLM generator 431.

Referring to FIG. 9B, in one or more embodiments, the embedding layer 420 trained by second pre-training, when the actual target sound source is input, may output the embedding vector $e_{bus}$ corresponding to the target sound source to separate the target sound source from the mixed sound source input to the separation layer 440.

In one or more embodiments, the embedding layer 420 trained by the second pre-training, when the target sound sources including all included in the designated sound source group are input, may output the first embedding vector $e_{all}$ corresponding to the entirety of the designated sound source group from the mixed sound source input to the separation layer 440.

In one or more embodiments, the refining network 430 may perform third pre-training to output the second embedding vector $\hat{e}$ by inputting the first embedding vector $e_{all}$ and the scene information $i_{scene}$. The first embedding vector $e_{all}$ is the embedding of all the target sound sources included in the designated sound source group, and may have the form of a 128-dimensional vector in one or more examples. The scene information $i_{scene}$ is the output of the scene extractor trained by the first pre-training, and may have a 128-dimensional vector form in one or more examples. The second embedding vector $\hat{e}$ represents embedding for the target sound source corresponding to specific scene information $i_{scene}$, and may have a 128-dimensional vector form In one or more examples.

According to one or more embodiments, according to the third pre-training process, the refining network 430 may be trained using the target embedding vector (e.g., embedding vector $e_{target}$ of the target sound source) output by inputting the target sound source to the embedding layer 420 trained by the second pre-training and the second embedding vector $\hat{e}$ converted into from the first embedding vector based on the scene information $i_{scene}$.

According to one or more embodiments, in the third pre-training process, the refining network 430 may perform learning using the MSE between the second embedding vector e refined from the first embedding vector based on the scene information and the target embedding vector (e.g., the embedding vector $e_{target}$ of the target sound source) for the actual target sound source. MSE is the root mean square of the error and serves to reduce the overall error and may be calculated by the following equation.

$$\mathcal{L}_{MSE} = \|s - \hat{s}\|^2 \quad \text{[Equation 11]}$$

In one or more examples, s may correspond to the target signal, ands may correspond to the output of the neural network.

FIG. 10 is a table regarding the correlation between each piece of scene information and each target sound source according to one or more embodiments of the disclosure.

Referring to FIG. 10, the vertical axis indicates various scene information, and the horizontal axis indicates various target sound sources included in a designated sound source group. On the horizontal axis, four sources (vehicle_horn_and_car_horn_and_honking, fire alarm, police car and speech-child, female, male) may be included in the target sound source to be separated, and the other sources (bark, bicycle_bell, bus, car_passing_by, machine gun, motorcycle, subway and metro and underground, wind and walk, footstep) may be other sound sources than the target sound source.

For an experiment to verify the system of the disclosure, the FSD50k dataset corresponding to the target sound event was mixed with TAU-urban acoustic 2020 mobile (TAU 2020), which is an ASC dataset corresponding to the scene background, and used. In this scenario, as the acoustic scene information, data recorded by device A in TAU2020 was used, among which Bus, Metro, Metro station, Park, or Street traffic was used. Furthermore, considering that the sound event data is noisy and contributes to the degradation of separation performance, it was pre-refined to leave and mix only the target sound source. By the Scaper tool, acoustic scenes and sound sources were mixed. In each acoustic scene, the number of sound sources was set to 1 to 4 (including 1 to 2 target sound sources), the SNR to −3 to 3 dB, and the sampling rate to 16 kHz. For each scene, 10,000 train sets, 2,000 validation sets, and 1,000 test sets were generated, and a total of 50,000 train sets, 10,000 validation sets, and 5,000 test sets were generated for training and evaluation.

For example, in the case of bus scene information, the target sound sources to be separated may be vehicle_horn_and_car_horn_and_honking, police car and speech-child, female, male. For example, in the case of metro scene information, target sound sources to be separated may be fire alarm and speech-child, female, and male. For example, in the case of metro station scene information, target sound sources to be separated may be fire alarm and speech-child, female, and male. For example, in the case of park scene information, target sound sources to be separated may be speech-child, female, and male. For example, in the case of street traffic scene information, target sound sources to be separated may be vehicle_horn_and_car_horn_and_honking and police car.

According to one or more embodiments, the separation layer may perform a fourth pre-training process to be trained to separate the target sound source based on the input sound source and the second embedding vector. For example, the separation layer may separate the target sound source from the mixed sound source by refined embedding for the sound source designated as occurable in a designated specific scene through the pre-trained embedding layer, scene extractor, and refining network. In the fourth pre-training process, the separation layer may be trained through joint training along with other system components. In one or more examples, as the input for the fourth pre-training of the separation layer, only the mixed sound source input was used, and training may be performed using the negative SI-SDR with the target sound source as the loss.

According to one or more embodiments, the acoustic separation system may perform measurement using segmental SI-SDRi corresponding to the SI-SDR enhancement value in the range where the actual target sound source is present. The method used for comparative evaluation is an algorithm that excludes refining according to scenes in the method proposed herein, and may have a similar form to the conventional sound selector-based multi-sound extracting method. Table 1 below shows the results of comparison in acoustic scenewise separation performance between the method proposed in the disclosure and the control group. Referring to Table 1, although there is a slight difference for each scene, the overall average performance is slightly higher.

TABLE 1

| | Segmental SI-SDRi (dB) | | | | | |
|---|---|---|---|---|---|---|
| | Bus | Metro | Metrostation | Park | Street traffic | Average |
| Proposed method | 15.33 | 13.75 | 12.21 | 11.83 | 9.6 | 12.54 |
| Control group | 15.34 | 15.55 | 11.87 | 11.16 | 10.09 | 12.40 |

Furthermore, Table 2 shows comparison of results when performing joint training (e.g., fourth pre-training process) using the embedding layer by the second pre-training rather than training the layer with randomly initialized parameters while joint-training the separation layer. Using pre-trained separation layers in all scenes may enhance performance.

TABLE 2

| | Segmental SI-SDRi (dB) | | | | | |
|---|---|---|---|---|---|---|
| | Bus | Metro | Metro-station | Park | Street traffic | Average |
| Baseline | 15.33 | 13.75 | 12.21 | 11.83 | 9.6 | 12.54 |
| pre-trained separation layer | 15.39 | 14.45 | 12.82 | 12.04 | 10.22 | 12.98 |

Table 3 shows comparison in performance depending on how to condition the model in the training step. Baseline is the model (12 times/12 times) resultant when all separation layers are conditioned in the second pre-training and fourth pre-training. Method 1 and Method 2 are models modified based on conditioning on a single point. For example, Method 1 is a model (12 times/1 time) obtained by conditioning all the layers in the second pre-training and conditioning on a single point in the fourth pre-training, and Method 2 is a model (1 time/1 time) trained by conditioning on a single point in both the second pre-training and fourth pre-training.

TABLE 3

| | Segmental SI-SDRi (dB) | | | | | |
|---|---|---|---|---|---|---|
| | Bus | Metro | Metrostation | Park | Street traffic | Average |
| Baseline | 15.33 | 13.75 | 12.21 | 11.83 | 9.6 | 12.54 |
| Method 1 | 16.16 | 15.13 | 13.44 | 11.81 | 10.34 | 13.38 |
| Method 2 | 15.55 | 14.27 | 13.01 | 11.36 | 9.83 | 12.81 |

As a result, it may be identified that single point conditioning in the fourth pre-training may bring a meaningful enhancement in performance, and single point conditioning in the second pre-training shows better performance than that of the baseline despite a slight performance lowering. Therefore, the method for separating a target sound source according to one or more embodiments of the disclosure may accurately select a sound to be separated according to a scene switch so that the listener separates and listens to her desired sound in a specific scene.

According to one or more embodiments of the disclosure, a method 300a, 300b for separating a target sound source may comprise obtaining 360 a mixed sound source including at least one sound source. According to one or more embodiments, the method 300a, 300b for separating the target sound source may comprise obtaining 370 scene information related to the mixed sound source, based on the obtained mixed sound source. According to one or more embodiments, the method 300a, 300b for separating the target sound source may comprise converting 380 a first embedding vector corresponding to a designated sound source group into a second embedding vector, based on the obtained scene information. According to one or more embodiments, the method 300a, 300b for separating the target sound source may comprise separating 390 the target sound source from the mixed sound source, based on the obtained mixed sound source and the second embedding vector.

According to one or more embodiments, the method 300a, 300b for separating the target sound source may comprise performing 320 a first pre-training process to learn a scene information vector based on obtaining an input sound source. According to one or more embodiments, in the method 300a, 300b for separating the target sound source, the obtaining 370 the scene information may comprise outputting the scene information vector based on the mixed sound source.

According to one or more embodiments, in the method 300a, 300b for separating the target sound source, the performing 320 the first pre-training process may comprise outputting the scene information vector based on the obtaining of the input sound source and learning to classify a designated scene based on the output scene information vector.

According to one or more embodiments, in the method 300a, 300b for separating the target sound source, the obtaining 370 the scene information may comprise generating an instance vector corresponding to the scene information based on the mixed sound source.

According to one or more embodiments, in the method 300a, 300b for separating the target sound source, the first embedding vector may corresponds to an entirety of the designated sound source group. According to one or more embodiments, in the method 300a, 300b for separating the target sound source, the converting 380 the first embedding vector into the second embedding vector may comprise converting the first embedding vector into the second embedding vector corresponding to at least a portion of the designated sound source group based on the scene information.

According to one or more embodiments, the method 300a, 300b for separating the target sound source may further comprise performing 330 a second pre-training process to learn partial embedding vectors, each of the partial embedding vectors corresponding to a respective sound source included in the designated sound source group. According to one or more embodiments, in the method 300a, 300b for separating the target sound source, the first embedding vector may be a sum vector of the partial embedding vectors.

According to one or more embodiments, in the method 300a, 300b for separating the target sound source, the converting 380 the first embedding vector into the second embedding vector may comprise identifying the target sound source included in the designated sound source group corresponding to the scene information and converting the first embedding vector into the second embedding vector to correspond to the target sound source.

According to one or more embodiments, in the method 300a, 300b for separating the target sound source, the designated sound source group may include at least one target sound source designated to correspond to the scene information.

According to one or more embodiments, the method 300a, 300b for separating the target sound source may further comprise performing 340 a third pre-training process to learn the conversion from the first embedding vector into the second embedding vector, based on an embedding vector between specific scene information and a specific target sound source corresponding to the specific scene information.

According to one or more embodiments, in the method 300a, 300b for separating the target sound source, the separating 390 the target sound source may comprise generating the target sound source having a vector form with the same size as the mixed sound source by applying the second embedding vector to the obtained mixed sound source.

According to one or more embodiments of the disclosure, an electronic device 101, 200 may comprise an input interface 220, a memory storing at least one instruction 230, and at least one processor 210 operatively connected with the input interface 220 and the memory 230. The at least one processor 210 may be configured to execute the at least one instruction, obtain a mixed sound source including at least one sound source from the input interface 220. The at least one processor 210 may be configured to execute the at least one instruction, obtain scene information related to the mixed sound source, based on the obtained mixed sound source. The at least one processor 210 may be configured to execute the at least one instruction, convert a first embedding vector corresponding to a designated sound source group into a second embedding vector, based on the obtained scene information. The at least one processor 210 may be configured to execute the at least one instruction, separate a target sound source from the mixed sound source, based on the obtained mixed sound source and the second embedding vector.

According to one or more embodiments, in the electronic device 101, 200, the at least one processor 210 may be further configured to execute the at least one instruction, perform a first pre-training process to learn a scene information vector based on obtaining an input sound source. The at least one processor 210 may be further configured to execute the at least one instruction, as at least part of the obtaining the scene information, output the scene information vector based on the mixed sound source.

According to one or more embodiments, in the electronic device 101, 200, the at least one processor 210 may be further configured to execute the at least one instruction, as at least part of the performing the first pre-training process, output the scene information vector based on the obtaining of the input sound source and learn to classify a designated scene based on the output scene information vector.

According to one or more embodiments, in the electronic device 101, 200, the at least one processor 210 may be further configured to execute the at least one instruction, as at least part of the obtaining the scene information, generate an instance vector corresponding to the scene information based on the mixed sound source.

According to one or more embodiments, in the electronic device 101, 200, the first embedding vector may corresponds to an entirety of the designated sound source group. The at least one processor 210 may be configured to execute the at least one instruction, as at least part of the converting the first embedding vector into the second embedding vector, convert the first embedding vector into the second embedding vector corresponding to at least a portion of the designated sound source group based on the scene information.

According to one or more embodiments, in the electronic device 101, 200, the at least one processor 210 may be further configured to execute the at least one instruction, perform a second pre-training process to learn partial embedding vectors, each of the partial embedding vectors corresponding to a respective sound source included in the designated sound source group. The first embedding vector may be a sum vector of the partial embedding vectors.

According to one or more embodiments, in the electronic device 101, 200, the at least one processor 210 may be further configured to execute the at least one instruction, as at least part of the converting the first embedding vector into the second embedding vector, identify the target sound source included in the designated sound source group corresponding to the scene information and convert the first embedding vector into the second embedding vector to correspond to the target sound source.

According to one or more embodiments, in the electronic device 101, 200, the designated sound source group may include at least one target sound source designated to correspond to the scene information.

According to one or more embodiments, in the electronic device 101, 200, the at least one processor 210 may be further configured to execute the at least one instruction, perform a third pre-training process to learn the conversion from the first embedding vector into the second embedding vector, based on an embedding vector between specific scene information and a specific target sound source corresponding to the specific scene information.

According to one or more embodiments, in the electronic device 101, 200, the at least one processor 210 may be further configured to execute the at least one instruction, as at least part of the separating the target sound source, generate the target sound source having a vector form with the same size as the mixed sound source by applying the second embedding vector to the mixed sound source.

According to one or more embodiments of the disclosure, a non-transitory computer-readable storage medium storing one or more programs may comprise obtaining a mixed sound source including at least one sound source. The storage medium may comprise obtaining scene information related to the mixed sound source, based on the obtained mixed sound source; The storage medium may comprise converting a first embedding vector corresponding to a designated sound source group into a second embedding vector, based on the obtained scene information. The storage medium may comprise separating the target sound source from the mixed sound source, based on the obtained mixed sound source and the second embedding vector.

What is claimed:

1. A method for separating a target sound source, the method comprising:
    obtaining a mixed sound source including at least one sound source;
    obtaining, based on the mixed sound source, scene information related to the mixed sound source;
    converting, based on the scene information, a first embedding vector corresponding to a designated sound source group into a second embedding vector; and
    separating, based on the mixed sound source and the second embedding vector, the target sound source from the mixed sound source.

2. The method of claim 1, further comprising:
    performing a first pre-training process to learn a scene information vector based on obtaining an input sound source,
    wherein the obtaining the scene information comprises outputting the scene information vector based on the mixed sound source.

3. The method of claim 2, wherein the performing the first pre-training process comprises outputting the scene information vector based on the obtaining of the input sound source and learning to classify a designated scene based on the output scene information vector.

4. The method of claim 1, wherein the obtaining the scene information comprises generating an instance vector corresponding to the scene information based on the mixed sound source.

5. The method of claim 1, wherein the first embedding vector corresponds to an entirety of the designated sound source group, and
    wherein the converting the first embedding vector into the second embedding vector comprises converting the first embedding vector into the second embedding vector corresponding to at least a portion of the designated sound source group based on the obtained scene information.

6. The method of claim 1, further comprising:
    performing a second pre-training process to learn partial embedding vectors, each of the partial embedding vectors corresponding to a respective sound source included in the designated sound source group,
    wherein the first embedding vector is a sum vector of the partial embedding vectors.

7. The method of claim 6, wherein the converting the first embedding vector into the second embedding vector comprises:
    identifying the target sound source included in the designated sound source group corresponding to the scene information; and
    converting the first embedding vector into the second embedding vector to correspond to the target sound source.

8. The method of claim 1, wherein the designated sound source group includes at least one target sound source designated to correspond to the scene information.

9. The method of claim 1, further comprising performing a third pre-training process, based on an embedding vector between specific scene information and a specific target sound source corresponding to the specific scene information, to learn the conversion from the first embedding vector into the second embedding vector.

10. The method of claim 1, wherein the separating the target sound source comprises generating the target sound source having a vector form with the same size as the mixed sound source by applying the second embedding vector to the mixed sound source.

11. An electronic device comprising:
    an input interface;
    a memory storing at least one instruction; and
    at least one processor operatively connected with the input interface and the memory,
    wherein the at least one processor is configured to execute the at least one instruction to:
        obtain, from the input interface, a mixed sound source including at least one sound source,
        obtain, based on the mixed sound source, scene information related to the mixed sound source
        convert, based on the scene information, a first embedding vector corresponding to a designated sound source group into a second embedding vector, and
        separate, based on the mixed sound source and the second embedding vector, the target sound source from the mixed sound source.

12. The electronic device of claim 11, wherein the at least one processor is further configured to execute the at least one instruction to:
    perform a first pre-training process to learn a scene information vector based on obtaining an input sound source, and
    as at least part of the obtaining the scene information output the scene information vector based on the mixed sound source.

13. The electronic device of claim 12, wherein the at least one processor is further configured to: as at least part of the performing the first pre-training process, output the scene information vector based on the obtaining of the input sound source and learn to classify a designated scene based on the output scene information vector.

14. The electronic device of claim 11, wherein the at least one processor is further configured to execute the at least one instruction to: as at least part of the obtaining the scene information, generate an instance vector corresponding to the scene information based on the mixed sound source.

15. The electronic device of claim 11, wherein the first embedding vector corresponds to an entirety of the designated sound source group, and
    wherein the at least one processor is further configured to:
        as at least part of the converting the first embedding vector into the second embedding vector, convert the first embedding vector into the second embedding vector corresponding to at least a portion of the designated sound source group based on the scene information.

16. The electronic device of claim 11, wherein the at least one processor is further configured to execute the at least one instruction to perform a second pre-training process to learn partial embedding vectors, each of the partial embedding vectors corresponding to a respective sound source included in the designated sound source group, and
    wherein the first embedding vector is a sum vector of the partial embedding vectors.

17. The electronic device of claim 16, wherein the at least one processor is further configured to execute the at least one instruction to: as at least part of the converting the first embedding vector into the second embedding vector, identify the target sound source included in the designated sound source group corresponding to the scene information and convert the first embedding vector into the second embedding vector to correspond to the target sound source.

18. The electronic device of claim 11, wherein the designated sound source group includes at least one target sound source designated to correspond to the scene information.

19. The electronic device of claim 11, wherein the at least one processor is further configured to execute the at least one instruction to perform a third pre-training process, based on an embedding vector between specific scene information and a specific target sound source corresponding to the specific scene information, to learn the conversion from the first embedding vector into the second embedding vector.

20. The electronic device of claim 11, wherein the at least one processor is further configured to execute the at least one instruction to: as at least part of the separating the target sound source, generate the target sound source having a vector form with the same size as the mixed sound source by applying the second embedding vector to the mixed sound source.

* * * * *